Patented July 6, 1948

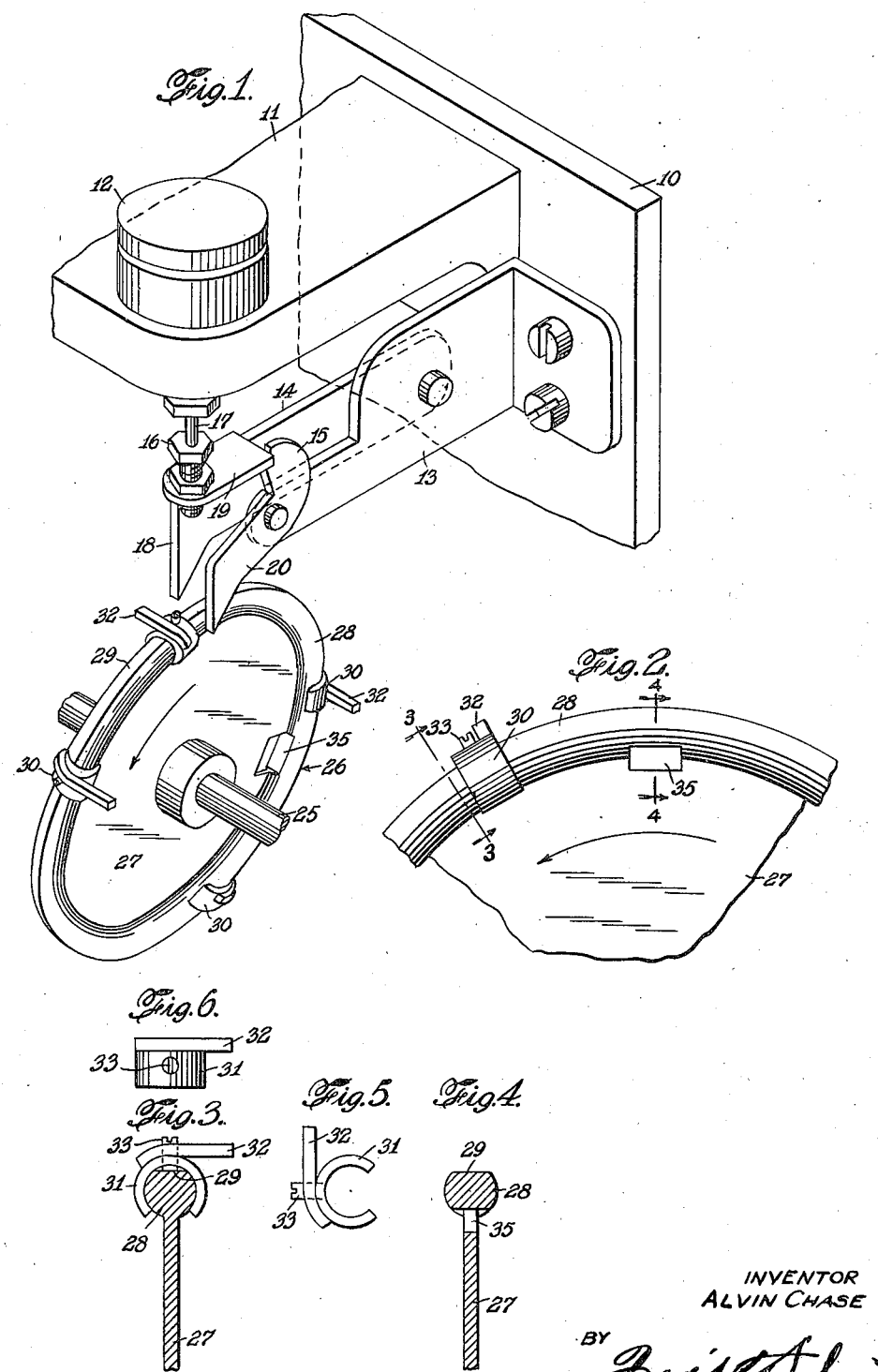

2,444,495

UNITED STATES PATENT OFFICE 2,444,495

TAPPET-ACTUATING MEMBER

Alvin Chase, Waterbury, Conn., assignor to The Bristol Company, Waterbury, Conn., a corporation of Connecticut Application April 18, 1946, Serial No. 663,082

13 Claims. (Cl. 74—568)

This invention relates to cam members such as may be utilized in process time cycle controllers, and more especially to means for operating a valve or switch, or equivalent control element in a cycle controller of the cam-actuated type wherein it is required that said valve or switch or equivalent be abruptly set in either of two significant positions at any preselected instant in the time-range of the controller. The art in process cycle controllers of the class in which the present invention lies is well exemplified in the co-pending application Serial No. 375,097 for improvements in process cycle controllers, filed January 21, 1941 by Harold E. Allen, now Patent No. 2,442,835, and assigned to the assignee of the applicant for patent covering the present invention.

The control instrument set forth and claimed in said H. E. Allen application includes a plurality of pilot valves adapted for abrupt opening or closing at preselected instants in a cycle of operation by means of corresponding cam members carried on a common shaft, together with means for advancing said shaft in such a manner that as the time cycle progresses said valves will be operatively engaged or disengaged by suitable conformed portions of the peripheries of said cam members. As shown in said application, each of the cam members is formed with peripheral portions having either of two definite radius values, and as the valve actuating element is engaged thereby it will assume an open or closed position according to which of said portions participates in said engagement.

An important attribute of process cycle controllers lies in flexibility of timing adjustment, and the ease and expediency with which adjustment may be effected. In the instrument set forth in said Allen application, the cams are characterized by having their peripheral profiles definitely formed before assembly; and, while by the use of a laminated construction there may be made possible a certain degree of flexibility in adjustment, complete adjustability requires a variety of types and forms of cam elements, involving a considerable number of "spares," some of which will at all times be idle, together with the assembly problem attendant upon removing certain elements and replacing them by others.

It is an object of the present invention to provide a combination of a quick-acting control with an actuating cam member capable of infinite adjustment, with a minimum number of parts, and without the need for "spares."

It is a further object to provide a cam member of this nature in which means for determining the "opening" and the "closing" events in the controlled cycle may be independently and non-interferingly set each at any desired point on the periphery.

It is a further object to provide a cam member of the aforesaid nature in which any desired number of alternate "opening" and "closing" events may be adjustably and non-interferingly grouped upon a single cam.

It is a further object to provide an adjustable cam member of the aforesaid nature which shall be at once rugged in construction, inexpensive to manufacture, and not subject to accidental displacement of active parts, with consequent shifting of the time setting, or interference with the pre-established cycle.

In carrying out the purposes of the invention, it is proposed to provide in combination with valve or equivalent control means adapted to actuation by means of a tappet of the latching type, cam means comprising, in the specific embodiment herein described by way of example, a rotatable discoid element carrying on its peripheral portion adjustably positioned identical dog members, each having an axial projection so disposed that the action of each of said dog members with respect to either opening or closing said control means depends solely upon the axial sense in which said projection is extended. It is further proposed so to conform and dispose each of said dog members with respect to the discoid element by which it is carried that it may be set to become operative at any point through the whole circumference thereof, thus rendering the time setting of each event controlled thereby subject to infinitely precise adjustment.

The nature of the invention, however, will best be understood when described in connection with the accompanying drawings, in which:

Fig. 1 is a perspective view of a portion of a time cycle controller incorporating the principles of the invention.

Fig. 2 is a fragmentary end elevation of a portion of a cam member constructed according to the principles of the invention, and is shown on an enlarged scale.

Figs. 3 and 4 are views in vertical section, taken on the lines 3—3, and 4—4, respectively, in Fig. 2.

Fig. 5 is a front elevation and Fig. 6 is a plan view of a portion of the mechanism forming a part of said cam member.

Referring now to Fig. 1 of the drawings, 10 designates a base plate carrying a bracket member 11 upon which is suitably mounted a control valve 12, which may expediently be of the type set forth and disclosed in U. S. Letters Patent No. 1,890,494, granted to P. A. Borden December 12, 1932, and including a stem having two extreme positions, and adapted to actuation to either of said positions by means of a tappet element presently to be described. Alternatively to the valve 12 there may be mounted a control element in the form of an electric switch, for example of the type exemplified in the U. S. Letters Patent No. 1,960,020, granted to P. K. McGall, May 22, 1934. In fact said valve may be replaced by any form of control device adapted to actuation to either of two significant positions by means of limited excursion of a juxtaposed tappet member.

Secured to the base-plate 10 is a further bracket member 13, extending forwardly from said base plate, and adapted to provide bearings for a tappet arm 14 and a latch member 15. The tappet arm 14 carrying a vertically adjustable tappet screw 16, is journalled to said bracket member 13 at a point near the base plate 10 and is adapted for limited angular displacement about an axis, whereby said screw will engage the stem 17 of the valve 12, and with displacement of said tappet arm, will actuate said valve in a generally vertical sense in accordance with the displaced position of said arm. A downwardly extending portion of said tappet arm is formed into a cam follower part 18 having an inclined surface adapted to operative engagement by actuating means hereinafter to be set forth. A horizontally extending portion of said tappet arm is formed into a rest or stop 19 adapted for engagement by the latch member 15 journalled toward the outward extremity of the bracket 13, to be supported thereby in its uppermost operating position. The latch member 15 is provided with a downwardly extending portion 20 conformed to function as a trigger or cam follower, similar to the cam follower 18 and similarly adapted for operative engagement. The relation between the tappet arm 14 and the latch 15 is made such that when the former has been lifted to its uppermost setting, as shown in Fig. 1 of the drawings, the latch 15, impelled by gravity (or, if desired, by spring means not shown in the drawing), will assume a position to support the rest 19, and thereby the whole of the tappet arm 14 in said setting. Under this condition, the cam follower portion 18 of the tappet arm 14 will rest materially higher in elevation than the corresponding part 20 of the latch member 15. Upon the cam follower 20 being lifted to its uppermost position, the rest 19 will be released, allowing the tappet arm 14 to fall to its lowest setting, actuating the valve 12 in a sense opposite to that corresponding to its former condition. While, with the tappet arm 14 depressed, the position of the latch 15 becomes of no significance, the juxtaposed faces of the stop 19 and the latch may expediently be so formed that the latter will at that time be retained in its highest position. Thus engagement of the cam follower 18 by suitable means will cause the valve 12 to be actuated in one sense (i. e. opened), and to remain so, until actuation of the cam follower 20 by other and similar means will cause said valve to be actuated in the opposite sense (i. e. closed).

The cam mechanism for actuating the control element 12 through the agency of the tappet arm 14 and the latch 15, and to which the present invention is specifically directed, will now be described. A shaft 25, which may be supported and journalled in bearing members designed to be secured to the base plate 10, but not shown in the drawing, is adapted to be rotated about its axis, either continuously or intermittently, according to the nature of the process cycle to be controlled, by suitable motor means, forming no part of the present invention and not shown in the drawing, but of a nature fully set forth and described in said Allen application, Serial No. 375,097. Secured to the shaft 25 to be rotated thereby in a direction as indicated by the arrow is a discoid member 26 formed preferably of metal, and having a flat central portion 27 and a continuous rim portion 28 of generally toroidal conformation but with a flattened peripheral surface 29 of cylindrical curvature.

Adapted to be adustably mounted upon the rim portion 28 in clamping relationship are identical dogs 30, the number of these provided depending upon the number of events in the cycle to be controlled, and the same are constructed as follows: A C-shaped base portion 31, Figs. 3 and 5, is formed of stiff material, such as stainless steel, and is conformed to a cylindrical curvature corresponding to that of the section of the toroidal rim 28, to embrace the same. Secured, as by welding, to the base portion 31, and integral therewith, is a finger or tappet-engaging part 32 projecting tangentially to the curved surface of said base portion, and in one direction only, substantially perpendicular to a radius thereof. A set screw 33, threaded through the material of the base part 31, serves, when said base part is mounted upon the rim 28, to engage the flattened peripheral surface 29, producing a clamping action, whereby said dog may be secured at any desired position about the toroidal periphery of the discoid member 26.

In order that dogs may be placed upon, or removed from, the rim 28, there is provided a single opening or window 35, perforated in part through the flat central portion 27, and in part cut through the contiguous inner face of the rim portion 28. The length and width of said window are such as to allow a portion of the base part 31 and attached portion of the finger part 32 to be passed through the window; and the radial position of said window, with respect to the rim portion 28 is such that when the dog 30 is turned on its side with the finger part 32 extended radially, the open side of the C-shaped base part 31 will just pass the flats on the toroidal rim to allow the latter to be embraced by the former. This relationship will be made clear by inspection and comparison of Figs. 4 and 5. Once placed upon the rim in this manner, the dog may be rotated about the axis of the rim through an angle of 90 degrees into its normal operating position, as indicated in Fig. 3, and slid along the rim 28 to be clamped in any desired circumferential location thereon by means of the set screw 33.

It will be observed that a dog 30 may be placed upon the rim of the cam in either of two operative positions, viz., with the finger part 32 directed toward either the right-hand or the left-hand end of the shaft 25, whereby to actuate respectively either the tappet arm 14 or the latch 15. It will be apparent that, while in Fig. 1 four actuating dogs are shown assembled on the cam, it is possible to utilize a greater or a lesser number as occasion may demand.

I claim:

1. A cam member for actuating tappet mechanism, comprising a movable supporting element having a portion of substantially uniform thickness surmounted by an expanded toroidal rim portion with flattened peripheral surface of cylindrical curvature; means slidably mounted over the expanded portion for adjustment along the same, and having a tappet-engaging finger projecting in its adjusted location laterally therefrom; and clamping means to secure against displacement in its adjusted location said slidably mounted means to the expanded rim portion of the movable element.

2. The cam member claimed in claim 1, wherein the supporting element is flat, and the tappet-engaging finger is movable therewith in a plane parallel to said supporting element.

3. The cam member claimed in claim 1, wherein the tappet-engaging finger overhangs the supporting element.

4. The cam member claimed in claim 1, wherein a plurality of tappet-engaging fingers are carried by the movable supporting element and overhang the same on opposite sides thereof.

5. The cam member claimed in claim 1, wherein the supporting element is a rotatable, discoid plate.

6. The cam member claimed in claim 1, wherein the supporting element is a rotatable, discoid member, and the tappet-engaging finger overhangs the same and extends parallel to the axis of rotation of said discoid member to rotate therewith in a plane parallel to said discoid member.

7. The cam member claimed in claim 1, wherein the slidably mounted means is C-shaped, and is conformed to and adapted to encircle the toroidal expanded rim portion over more than half its contour.

8. The cam member claimed in claim 1, wherein the slidably mounted means is C-shaped and is conformed to and adapted to encircle the toroidal expanded rim portion over more than half its contour, and a tappet-engaging finger projects tangentially therefrom opposite its opening.

9. The cam member claimed in claim 1, wherein a set screw passes through the slidably mounted means to bear against the flattened peripheral surface of the supporting element to hold a tappet-engaging means in its adjusted position thereto.

10. The cam member claimed in claim 1, wherein the slidably mounted means is C-shaped, and is conformed to and adapted to encircle the toroidal expanded rim portion over more than half its contour, and an opening is provided through the supporting element adjacent the expanded rim portion and through a contiguous portion of the latter to pass said C-shaped means in a position at right angles to its tappet-actuating position.

11. A cam member for actuating tappet mechanism, comprising a flat plate part movable in a sense parallel to a plane of its surface, and having an expanded rim portion of cross-section substantially circular and of a diameter greater than the thickness of said plate and with a flattened outer edge part; and tappet-actuating means comprising a C-shaped member adapted to embrace said rim, encircling more than half the contour of said section, means for clampingly engaging said flattened edge part to secure said C-shaped member against displacement with respect to said rim portion, and a laterally projecting tappet-engaging finger.

12. A cam member for actuating tappet mechanism comprising a circular element having a rim portion of substantially toroidal conformation with a flattened peripheral surface of cylindrical curvature; and tappet-actuating means comprising a C-shaped member adapted to embrace said rim portion encircling more than half the contour of its section, means for clampingly engaging said flattened peripheral surface to secure said member against displacement with respect to said rim portion, and a laterally projecting tappet-engaging finger, said circular element being provided with a window-like opening adjacent the inner edge of said rim portion and a contiguous portion of the latter to an extent to permit said C-shaped member, after being rotated through an angle about its axis of curvature, to be passed with one curved extremity through said opening and the other curved extremity over the flattened outer peripheral surface of said rim portion for subsequent rotation to its normal operating position to embrace said rim-portion and be clamped thereto.

13. A cam member for actuating tappet mechanism, comprising a flat plate part movable in a plane parallel to its surface, and having an expanded rim portion of cross-section substantially circular and of a diameter greater than the thickness of said plate and with a flattened outer edge part; and tappet-actuating means comprising a plurality of identical C-shaped members each adapted to embrace the rim, encircling more than half of said section, having a laterally projecting tappet-engaging finger, and means for clampingly engaging said flattened edge part to secure said C-shaped members against displacement with respect to said rim portion, each of said members being adapted to be clamped with its laterally projecting finger extended on either side of the plate part to engage a corresponding one of a pair of cam-follower members.

ALVIN CHASE.

REFERENCES CITED

The following references are of record in the file of this patent:

UNITED STATES PATENTS

| Number | Name | Date |
| --- | --- | --- |
| 1,890,494 | Borden | Dec. 12, 1932 |
| 1,960,020 | McGall | May 22, 1934 |